(12) United States Patent
Kawarada

(10) Patent No.: US 8,750,699 B2
(45) Date of Patent: Jun. 10, 2014

(54) IMAGE CAPTURE APPARATUS

(75) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/406,743

(22) Filed: Feb. 28, 2012

(65) Prior Publication Data

US 2012/0237193 A1 Sep. 20, 2012

(30) Foreign Application Priority Data

Mar. 14, 2011 (JP) .................................. 2011-055223

(51) Int. Cl.
*G03B 3/10* (2006.01)
(52) U.S. Cl.
USPC ............................................................. 396/95
(58) Field of Classification Search
USPC ............................................................. 396/95
See application file for complete search history.

(56) References Cited

U.S. PATENT DOCUMENTS

| 5,739,856 A | * | 4/1998 | Watanabe | 348/349 |
| 7,773,146 B2 | * | 8/2010 | Suda | 348/354 |
| 2011/0002679 A1 | * | 1/2011 | Noto et al. | 396/95 |

FOREIGN PATENT DOCUMENTS

| JP | 60-249477 | 12/1985 |
| JP | 3218730 | 10/2001 |

* cited by examiner

*Primary Examiner* — Clayton E LaBalle
*Assistant Examiner* — Dennis Hancock
(74) *Attorney, Agent, or Firm* — Cowan, Liebowitz & Latman, P.C.

(57) ABSTRACT

An image capture apparatus which captures an object image formed by an imaging lens, comprises a focus detection unit which detects a focus position of the object image at a plurality of positions on an image sensing plane, a prediction unit which stores the past output from the focus detection unit, and predicts a locus of the focus position of the object image based on the stored output, thereby predicting the focus position of the object image at a predetermined time instant, a detection unit which detects a shift of the object image on the image sensing plane, and a control unit which changes the output from the prediction unit based on the output from the detection unit.

22 Claims, 11 Drawing Sheets

IMAGE CAPTURE APPARATUS

BACKGROUND OF THE INVENTION

1. Field of the Invention

The present invention relates to an automatic focus adjustment technique in an image capture apparatus.

2. Description of the Related Art

A focus detection apparatus which detects relative movement of a main object, to undergo focus detection, on a two-dimensional image sensing plane based on a change in luminance signal or color difference signal, thereby moving the focus detection position in accordance with the movement of the main object has conventionally been proposed, as described in Japanese Patent Laid-Open No. 60-249477.

A focus detection apparatus which predicts the focus position of a main object a predetermined time into the future based on a temporal change in characteristic of focus detection while continuously performing focus detection of the main object has conventionally been proposed as well, as described in Japanese Patent No. 03218730.

The focus detection apparatus described in Japanese Patent No. 03218730 calculates a moving velocity change curve in the direction in which the main object moves on the image plane based on the focus detection result obtained within a predetermined elapsed time to predict the focus position of the main object a predetermined time into the future. Before a moving velocity change curve is calculated, it is determined whether the change in velocity at which the main object moves on the image plane exceeds a predetermined threshold. If the change in velocity at which the main object moves on the image plane is small, a moving velocity change curve in the direction in which the main object moves on the image plane is calculated based on the focus detection result obtained over a relatively long elapsed time. If the change in velocity at which the main object moves on the image plane is great then a moving velocity change curve is calculated based on the focus detection result over a relatively short elapsed time. With such an operation, the prediction error can be kept small to a certain degree.

A focus detection apparatus which can perform focus detection of a main object even if the main object moves rapidly has been proposed, as described above. However, when focus detection is performed for, for example, a figure skater, the direction in which he or she moves may change rapidly in the middle of the performance due, for example, to a jump or fall, so it is difficult to continue to focus on the skater. This is because not only the velocity of the main object in the direction in which the main object moves on the image plane but also the composition of the main object on the two-dimensional image sensing plane changes.

SUMMARY OF THE INVENTION

The present invention makes it possible to continue to appropriately adjust the focus on a main object even if the motion characteristics of the main object change rapidly in an image capture apparatus having an autofocus function.

According to the first aspect of the present invention, there is provided an image capture apparatus which captures an object image formed by an imaging lens, the apparatus comprising: a focus detection unit which detects a focus position of the object image at a plurality of positions on an image sensing plane; a prediction unit which stores the past output from the focus detection unit, and predicts a locus of the focus position of the object image based on the stored output, thereby predicting the focus position of the object image at a predetermined time instant; a detection unit which detects a shift of the object image on the image sensing plane; and a control unit which changes the output from the prediction unit based on the output from the detection unit.

According to the second aspect of the present invention, there is provided an image capture apparatus which captures an object image formed by an imaging lens, the apparatus comprising: a focus detection unit which detects a focus position of the object image at a plurality of positions on an image sensing plane; a prediction unit which stores the past output from the focus detection unit, and predicts a locus of the focus position of the object image based on the stored output, thereby predicting the focus position of the object image at a predetermined time instant; a first detection unit which detects a shift of the object image on the image sensing plane using a method in which the first detection unit is influenced by the imaging lens; a second detection unit which detects a shift of the object image on the image sensing plane using a method in which the second detection unit is not influenced by the imaging lens; and a control unit which changes the output from the prediction unit based on a difference between the output from the first detection unit and the output from the second detection unit.

Further features of the present invention will become apparent from the following description of exemplary embodiments with reference to the attached drawings.

DESCRIPTION OF THE EMBODIMENTS

Embodiments of the present invention will be described below with reference to FIGS. 1 to 11.

(First Embodiment)

<Configuration of Digital Camera>

Figure 1:
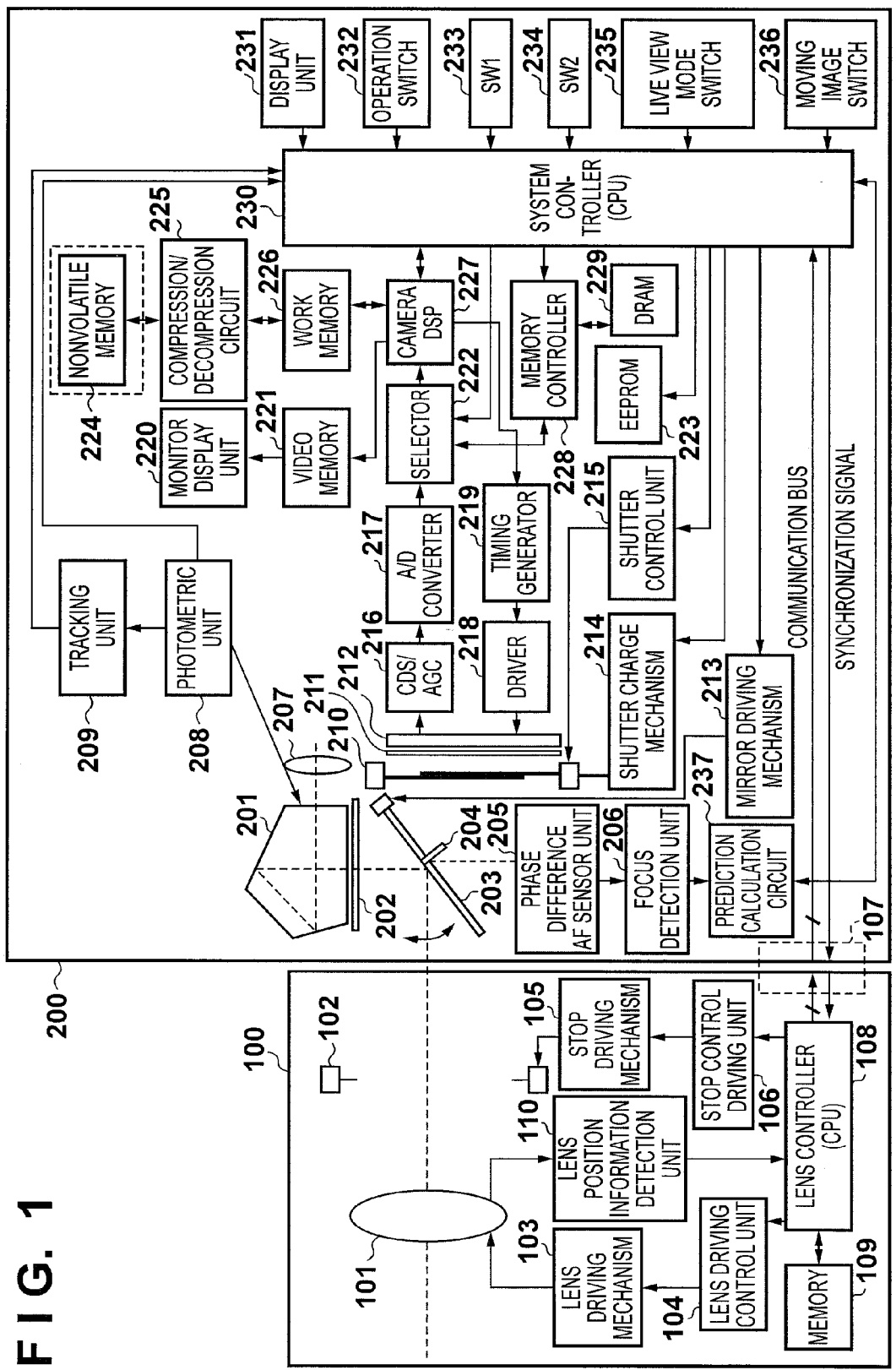
FIG. 1 is a block diagram showing the configuration of a digital camera according to the first embodiment of the present invention.

FIG. 1 is a block diagram showing the configuration of a digital camera according to the first embodiment of an image capture apparatus of the present invention. An imaging lens 100 is detachably mounted on a digital camera 200 via a lens mounting mechanism in a mount portion (not shown), as shown in FIG. 1. The mount portion is provided with an electric contact unit 107. The electric contact unit 107 has a terminal for a communication bus line including, for example, a communication clock line, a data transfer line, a data reception line. These lines allow the digital camera 200 and the imaging lens 100 to communicate with each other. The digital camera 200 communicates with the imaging lens 100 via the electric contact unit 107 to control driving of a focus lens 101 and a stop 102 which adjusts the amount of incident light, in the imaging lens 100. Although FIG. 1 shows only the focus lens 101 as a lens in the imaging lens 100, a scaling lens and a fixed lens are also provided in the imaging lens 100 to constitute a lens unit together with them. Also, the electric contact unit 107 is provided with a communication bus line and a synchronization signal line via which the charge storage timing of an image signal is transmitted from the camera side to the lens side.

A light beam from an object (not shown) is guided to a quick return mirror 203 in the digital camera 200 via the stop 102 and the lens unit including the focus lens 101 in the imaging lens 100. The quick return mirror 203 is arranged in the imaging optical path obliquely with respect to the optical axis. A mirror driving mechanism 213 performs up-down driving so as to move the quick return mirror 203 between a first position (shown in FIG. 1) at which it guides a light beam from the object to an upper, viewfinder optical system, and a second position at which it is retracted outside the imaging optical path.

The quick return mirror 203 includes a half mirror at its central portion. When the quick return mirror 203 is in its lower, first position, a certain component of a light beam from the object is transmitted through the half mirror portion. The transmitted light beam is reflected by a sub-mirror 204 provided on the back side of the quick return mirror 203.

Figure 2:
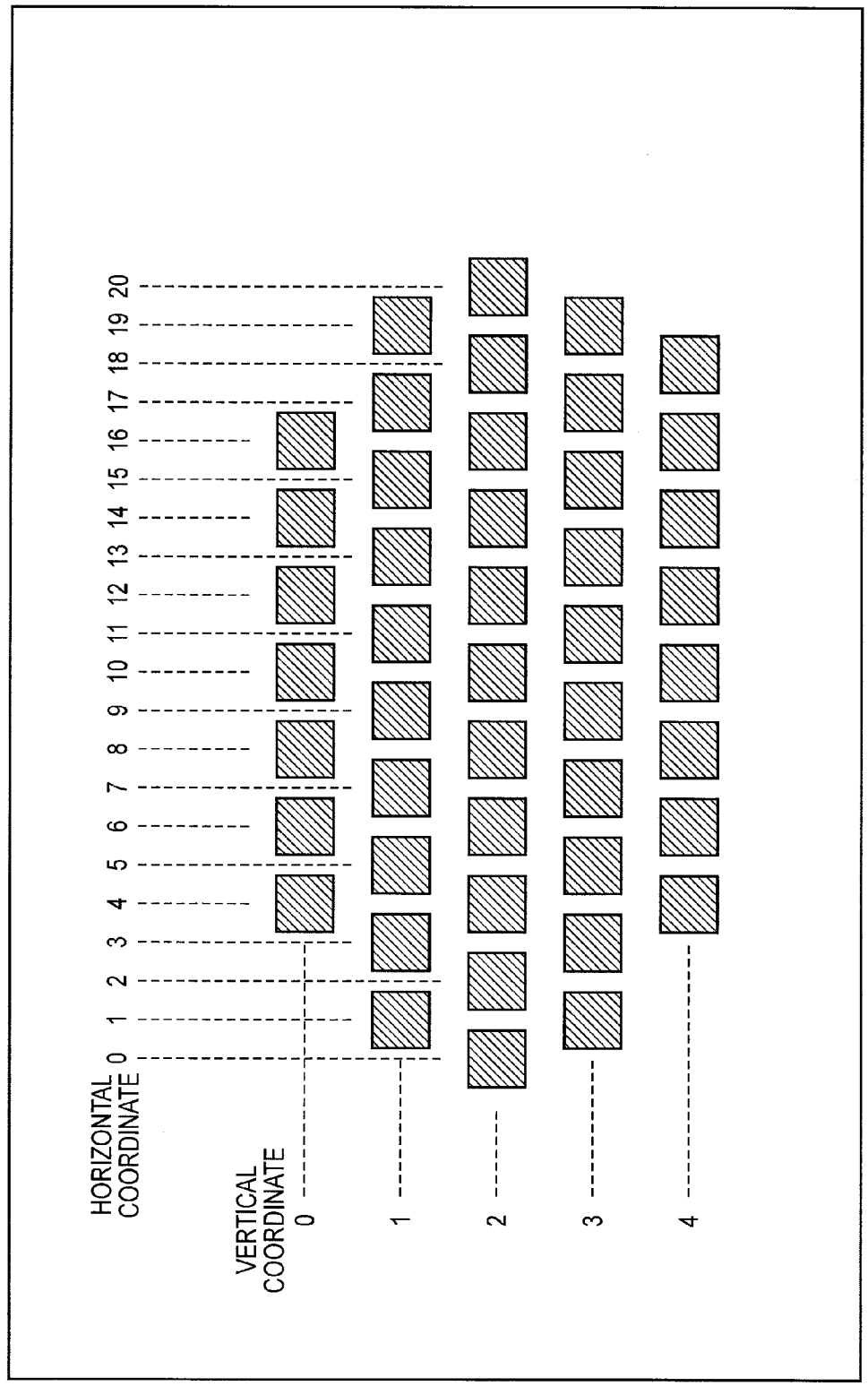
FIG. 2 is a schematic view for explaining a mode of the focus detection region on a phase difference AF sensor.

The light beam reflected by the sub-mirror 204 is guided to a phase difference AF sensor unit 205 which constitutes an automatic focus adjustment unit, together with a focus detection circuit 206 and a prediction calculation circuit 237. The phase difference AF sensor unit 205 is formed by a pair of known pupil division optical systems and pairs of known line sensors which split the light beam reflected by the sub-mirror 204, and the line sensors are present in correspondence with the focus detection regions. FIG. 2 shows a mode in which the phase difference AF sensor unit 205 includes a plurality of focus detection regions. Referring to FIG. 2, halftone regions indicate the focus detection regions on the two-dimensional image sensing plane. The phase difference AF sensor unit 205 shown as an example of the embodiment of the present invention includes a total of 45 focus detection regions, and outputs image signals from a pair of line sensors corresponding to each focus detection region to the focus detection circuit 206. Also, the charge storage time instant of each line sensor is output to the focus detection circuit 206. In this case, the charge storage time instant of each line sensor is the time instant which corresponds to the middle of the period from the start to the end of charge storage of this line sensor, and indicates the center of gravity of the charge storage timing. FIG. 2 shows the horizontal and vertical coordinates so as to designate and explain each focus detection region. The focus detection circuit 206 performs known phase difference detection based on correlation calculation from the input image signal output from each line sensor, and calculates the defocus amount between the current focus position of the focus lens 101 and the focus position of the object. The defocus amount is calculated in each focus detection region, and output to the prediction calculation circuit 237, together with the charge storage time instant of the corresponding line sensor. The prediction calculation circuit 237 predicts movement of the object on the image plane based on the input defocus amount in each focus detection region and an output from a tracking unit 209 (to be described later), thereby determining the required driving amount of the focus lens 101. The determined, required driving amount is sent to a lens controller 108 via a system controller 230, and the focus position of the focus lens 101 is controlled based on this required driving amount. The prediction calculation circuit 237 is also used to store the defocus amount in each focus detection region obtained by each of the past four focus detection operations, and predict movement of the object on the image plane a predetermined time into the future. Also, the prediction calculation circuit 237 selects a focus detection region especially of interest in predicting movement of the main object on the image plane, and predicts this movement based on an output from the focus detection region selected finally. Although movement of the main object on the image plane is predicted based on the defocus amount in each focus detection region obtained by each of the past four focus detection operations, the present invention is not limited to this, and the number of times of prediction may be changed.

On the other hand, the light beam reflected by the quick return mirror 203 reaches the eye of the photographer via a viewfinder optical system which constitutes a viewfinder screen 202, pentaprism 201, and eyepiece 207 present on the focal plane. Also, a photometric unit 208 is arranged to obliquely observe the light beam bent by the pentaprism 201, and performs photometry within the region of the light beam, which corresponds to the two-dimensional image sensing plane, for each of a plurality of regions obtained by dividing that region. The photometric results obtained in the above-mentioned divided regions are output to the system controller 230 and tracking unit 209.

The tracking unit 209 stores the photometric results of the two immediately preceding frames obtained in the divided regions, and tracks the region in which the main object is positioned in the two-dimensional image sensing plane by known correlation calculation. The tracking result is output to the system controller 230 as motion vector information including the direction and amount of movement.

When the quick return mirror 203 is in its upper, second position, the light beam from the imaging lens 100 reaches an image sensor 212 via a focal plane shutter 210 serving as a mechanical shutter and an optical filter 211. The optical filter 211 has a function of cutting infrared rays to guide only a visible light beam onto the image sensor 212, and the function of an optical lowpass filter. Also, the focal plane shutter 210 has front and rear curtains, and controls transmission and shielding of the light beam from the imaging lens 100.

Also, the digital camera 200 includes the system controller 230 which performs overall control. The system controller 230 uses, for example, a CPU or an MPU and controls the operation of each circuit (to be described later). The system controller 230 communicates with the lens controller 108 in the imaging lens 100 via a communication bus line via the electric contact unit 107. Like the system controller 230, the lens controller 108 uses, for example, a CPU or an MPU and controls the operation of each circuit in the imaging lens 100.

In communication between the system controller 230 and the lens controller 108, the driving command, stop command, driving amount, and driving speed of the focus lens 101 in the imaging lens 100 are transmitted from the system controller 230. Also, the driving amount and driving speed of the stop 102 are transmitted from the system controller 230. Moreover, requests to transmit various types of data on the lens side are transmitted from the system controller 230.

In focus driving, the system controller 230 communicates commands associated with the lens driving direction, driving amount, and driving speed with the lens controller 108. When the lens controller 108 receives a lens driving command from the system controller 230, it controls, via a lens driving control unit 104, a lens driving mechanism 103 which drives the focus lens 101 in the optical axis direction to perform focus control. The lens driving mechanism 103 includes a stepping motor as a driving source. When the lens controller 108 receives a stop control command from the system controller 230, it controls, via a stop control driving unit 106, the stop 102 to a command value by controlling a stop driving mechanism 105 which drives the stop 102.

Also, the system controller 230 is connected to a shutter control unit 215 and the photometric unit 208. The shutter control unit 215 controls traveling driving of the front and rear curtains of the focal plane shutter 210 in accordance with a signal from the system controller 230. A driving source for the front and rear curtains of the focal plane shutter 210 is formed by a spring, and requires a spring charge for the next operation after shutter traveling. A shutter charge mechanism 214 performs this spring charge. The system controller 230 stores a program diagram which defines an exposure control program for the charge storage time, exposure sensitivity, and F-number of the image sensor 212, and is set based on the exposure amount obtained from an output in a predetermined photometric region on the photometric unit 208 or image sensor 212. Also, the system controller 230 transmits a lens driving command to the lens controller 108 to control the lens driving mechanism 103 via the lens driving control unit 104. Thus, an object image is formed on the image sensor 212.

A camera DSP 227 includes a circuit block which calculates a contrast evaluation value used in contrast AF, and a circuit block which determines the position and size of a region in which contrast evaluation calculation is performed. Although these circuit blocks will be described in detail later, the contrast evaluation value mentioned herein means a value indicating the focus state of an optical system including the focus lens 101. The camera DSP 227 is connected to an A/D converter 217 via a timing generator 219 and a selector 222, and is also connected to a work memory 226.

Note that the image sensor 212 is controlled in accordance with an output from a driver 218 which controls horizontal driving and vertical driving for each pixel based on a signal from the timing generator 219 which determines the entire driving timing. Thus, the object image is photoelectrically converted to generate and output an image signal. The image signal generated by the image sensor 212 is amplified by a CDS/AGC circuit 216, and converted into a digital signal by the A/D converter 217. Upon setting the image sensing frame rate of the image sensor 212 by operation input from an operation switch 232, the digital camera 200 converts a signal output from the timing generator 219. Thus, the image sensing frame rate of the image sensor 212 is controlled in accordance with the above-mentioned setting. This image sensing frame rate may be changed in accordance with a plurality of shooting modes including a moving image shooting mode in which an image signal for a moving image is generated, and a still image shooting mode in which an image signal for a still image is generated.

Outputs from the A/D converter 217 are input to a memory controller 228 via the selector 222 which selects a signal based on a signal from the system controller 230, and are all transferred to a DRAM 229 serving as a frame memory. In a video camera or a compact digital camera, before shooting, this transfer result is transferred to a video memory 221 periodically (for each frame) to perform, for example, viewfinder display (live view) on a monitor display unit 220. In a digital single-lens reflex camera, before shooting, the image sensor 212 is normally shielded against light by the quick return mirror 203 and focal plane shutter 210, so live view display cannot be performed.

In this respect, the quick return mirror 203 is moved up to retract it from the imaging optical path, and then the focal plane shutter 210 is opened, thereby allowing a live view operation. Also, an image signal from the image sensor 212 is processed by the camera DSP 227 or system controller 230 in a live view so as to obtain a contrast evaluation value indicating the focus state of an optical system including the focus lens 101. Use of this evaluation value allows focus detection of the contrast evaluation method.

In shooting, each pixel data of one frame is read out from the DRAM 229, undergoes image processing by the camera DSP 227, and is temporarily stored in the work memory 226, in accordance with a control signal from the system controller 230. Data from the work memory 226 is compressed based on a predetermined compression format by a compression/decompression circuit 225, and the compression result is stored in an external nonvolatile memory 224. A nonvolatile memory such as a flash memory is commonly used as the nonvolatile memory 224. Alternatively, the nonvolatile memory 224 may be a hard disk or a magnetic disk. A display unit 231 connected to the system controller 230 displays a camera operation state, set or selected by each type of switch (to be described later), using display elements such as liquid crystal elements, LED (Light-Emitting Diode) elements, or organic EL elements.

The operation switch 232 serves as an operation member which performs operation input for various types of setting items of the digital camera 200. A release switch SW1 233 serves to start shooting preparation operations such as photometry and focus detection. A release switch SW2 234 serves to start a shooting operation (charge storage and charge read operations for obtaining a still image). A live view mode switch 235 serves to ON/OFF-control live view display. A moving image switch 236 serves to start a continuous shooting operation (repeated charge storage and charge read operations for obtaining a moving image).

On the other hand, in the imaging lens 100 serving as a lens unit, the lens controller 108 is provided with a memory 109. The memory 109 stores performance information including, for example, pieces of information indicating the focal length, full-aperture value, and settable stop driving speed of the imaging lens 100, and lens ID (identification) information as unique information to identify the imaging lens 100. Note that the performance information and the lens ID information are transmitted to the system controller 230 by initial communication when the imaging lens 100 is mounted on the digital camera 200, and are stored in an EEPROM 223 by the system controller 230.

Also, the imaging lens 100 is provided with a lens position information detection unit 110 for detecting the position information of the focus lens 101. The lens position information detected by the lens position information detection unit 110 is read into the lens controller 108. The lens position information is used to control driving of the focus lens 101, and transmitted to the system controller 230 via the electric contact unit 107. The lens position information detection unit 110 uses, for example, a pulse encoder which detects the rotation pulse count of a motor which forms, for example, a lens driving mechanism. The output of the lens position information detection unit 110 is connected to a hardware counter (not shown) in the lens controller 108, and the position information of the focus lens 101 is counted by hardware upon driving of the focus lens 101. When the lens controller 108 reads the lens position information, it accesses a register of an internal hardware counter, and reads a stored counter value.

Figure 3:
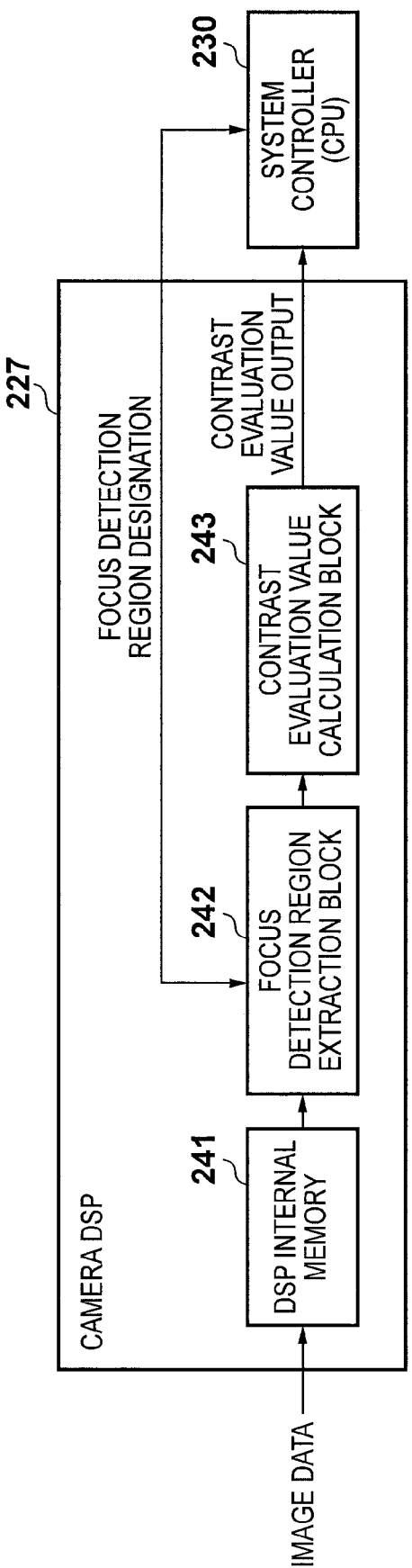
FIG. 3 is a block diagram for explaining a contrast evaluation value calculation circuit.

A contrast evaluation value calculation circuit block of the camera DSP 227 will be described next with reference to FIG. 3. FIG. 3 is a block diagram for explaining a circuit block in the camera DSP 227.

An image signal generated by the image sensor 212 is amplified by the CDS/AGC circuit 216, and converted into a digital signal by the A/D converter 217, as described above. Digitized image data is input to the camera DSP 227 via the selector 222. To calculate a contrast evaluation value used in contrast AF, image data input to the camera DSP 227 is input to a focus detection region extraction block 242 via a DSP internal memory 241 in the camera DSP 227 first. The focus detection region extraction block 242 serves to trim images of the focus detection region and its vicinity from the image data of the entire screen, and send the trimmed images to a contrast evaluation value calculation block 243 in the subsequent stage. The focus detection region desirably has a size of about ⅕ to ⅒ that of the outer frame of the screen. Note that the position and size of the focus detection region within the screen can be set in the focus detection region extraction block 242 by the system controller 230. The contrast evaluation value calculation block 243 serves to extract a predetermined frequency component by digital filter calculation from the images of the focus detection region and its vicinity, and send it to the system controller 230 as a contrast evaluation value.

<Method of Predicting Movement of Object on Image Plane>

Figure 4:
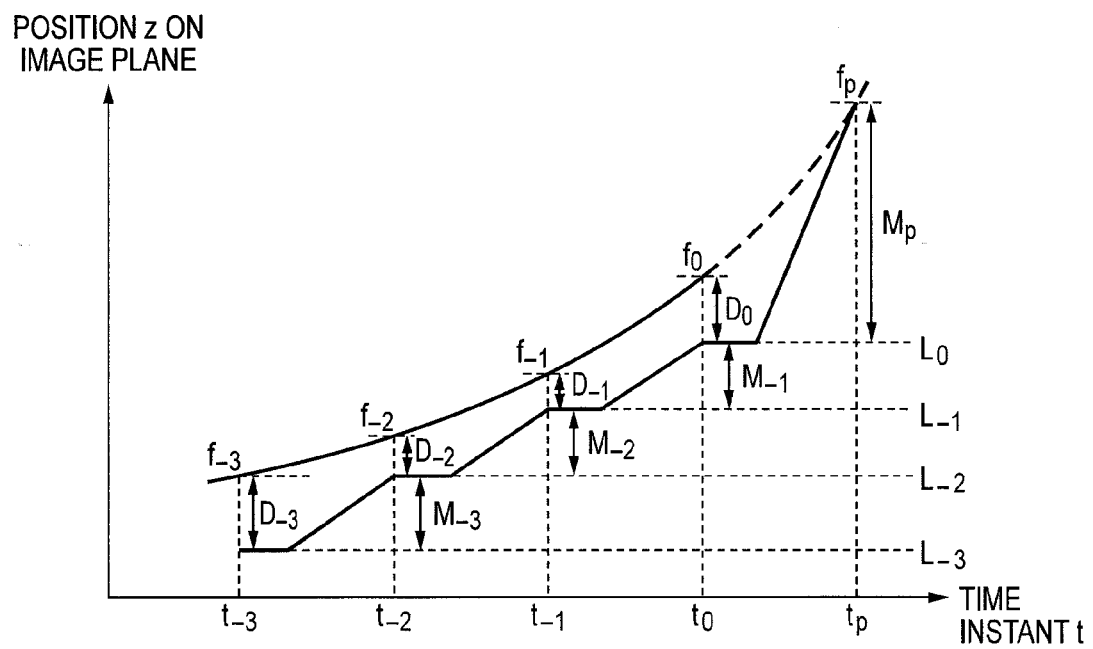
FIG. 4 is a graph for explaining a method of predicting movement of an object on the image plane.

A method of predicting movement of the main object on the image plane by the prediction calculation circuit 237 will be described next. FIG. 4 is a graph for explaining a method of predicting movement of the object on the image plane (the locus of the focus position). FIG. 4 shows charge storage time instant (to be precise, the time instant corresponding to the middle of storage of the charge storage time) $t_0$ associated with the immediately preceding focus detection operation, a detected defocus amount $D_n$ obtained at charge storage time instant $t_n$ associated with the nth focus detection operation to the past from the immediately preceding focus detection operation, and a driving amount $M_n$ by which the focus lens 101 is driven based on the detected defocus amount $D_n$. At time instant $t_p$, the focus lens 101 is started to move by a driving amount predicted based on defocus amounts $D_{-3}$ to $D_0$ obtained by the immediately preceding and further preceding focus detection operations, and an amount $M_p$ by which the focus lens 101 is driven from time instant $t_0$ to time instant $t_p$ is shown in FIG. 4. Also, the position of the object on the image plane at charge storage time instant $t_n$ is defined as $f_n$, and the position of the object on the image plane at time instant $t_p$ is defined as $f_p$. Also, the imaging position of the focus of the focus lens 101 is defined as $L_n$. Moreover, the predicted position $f_p$ of the object on the image plane upon movement at next focus detection time instant $t_p$, and the driving amount $M_p$ by which the focus lens 101 is driven to the position $f_p$ are shown in FIG. 4 based on the focus detection results obtained at time instants $t_0$ to $t_{-3}$.

In obtaining the velocity at which the object moves on the image plane based on the past four focus detection results, the image plane movement function of the object is described by a cubic equation f(t):

$$f(t) = h \times t^3 + i \times t^2 + j \times t + k \quad (1)$$

When $(t_{-3}, f_{-3})$ to $(t_0, f_0)$ are substituted into equation (1), we have:

$$\begin{pmatrix} t_{-3}^3 & t_{-3}^2 & t_{-3} & 1 \\ t_{-2}^3 & t_{-2}^2 & t_{-2} & 1 \\ t_{-1}^3 & t_{-1}^2 & t_{-1} & 1 \\ t_0^3 & t_0^2 & t_0 & 1 \end{pmatrix} \begin{pmatrix} h \\ i \\ j \\ k \end{pmatrix} = \begin{pmatrix} f_{-3} \\ f_{-2} \\ f_{-1} \\ f_0 \end{pmatrix} \quad (2)$$

Solving equation (2) yields coefficients (h, i, j, k) of the respective terms of the cubic equation f(t).

Note that the position $f_n$ of the object on the image plane is obtained by:

$$f_n = L_n + D_n \quad (3)$$

From the obtained image plane movement function f(t) of the object, the predicted position $f_p$ of the object on the image plane at time instant $t_p$ is obtained by:

$$f_p = h \times t_p^3 + i \times t_p^2 + j \times t_p + k \quad (4)$$

The driving amount $M_p$ of the focus lens 101 for moving the focus position to a predicted position $f_c$ of the object on the image plane at time instant $t_p$ is obtained by:

$$M_p = f_p - L_0 \quad (5)$$

A detected defocus amount $D_p$ (not shown) obtained at time instant $t_p$ is detected by the phase difference AF sensor unit 205 and focus detection circuit 206 so as to recursively predict movement of the object on the image plane. When the detected defocus amount $D_p$ (not shown) obtained at focus detection time instant $t_p$ has a small value, this means that the prediction accuracy is high. However, when the detected defocus amount $D_n$ obtained at focus detection time instant $t_p$ has a large value, this means that the prediction accuracy is low.

Although movement of the object on the image plane is predicted using a cubic equation in the above-mentioned predicting method, the present invention is not limited to this, and this movement may be predicted using an arbitrary multi-order equation in accordance with the calculation performance of the prediction calculation circuit 237.

<Switching of Predicting Method>

A characteristic operation according to this embodiment, that is, an operation of switching the method of predicting movement of the object on the image plane based on a shift of the objet in a two-dimensional plane perpendicular to the optical axis will be described next.

Figure 5A:
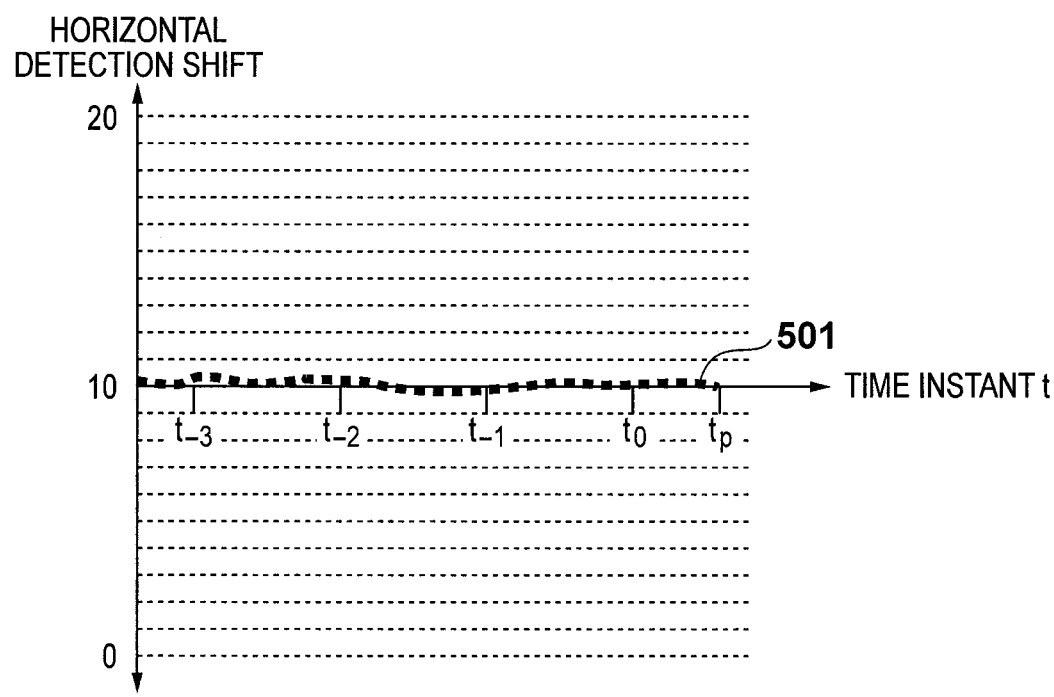
FIGS. 5A and 5B are graphs showing shifts of the object on the image sensing plane, which are detected by a tracking unit.
Figure 5B:
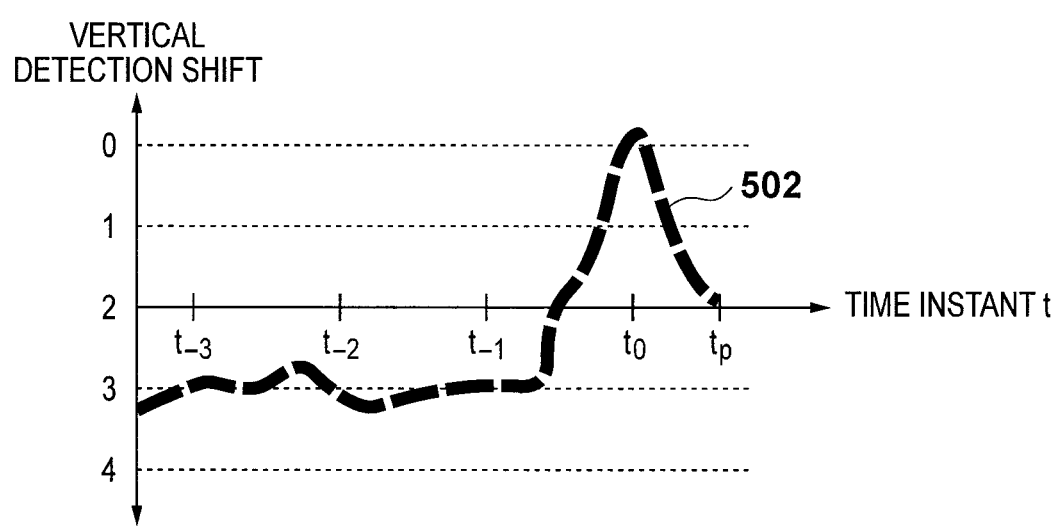

FIGS. 5A and 5B are graphs showing a shift of the object on the image sensing plane detected by the tracking unit 209. FIG. 5A shows a horizontal shift 501 of the object with reference to the image sensing plane of the image sensor 212. Also, FIG. 5B shows a vertical shift 502 of the object with reference to the image sensing plane of the image sensor 212. Referring to FIGS. 5A and 5B, numbers marked on the horizontal and vertical detection shift axes respectively correspond to the coordinates of the focus detection region shown in FIG. 2. The horizontal shift 501 and vertical shift 502 shown in the graphs of FIGS. 5A and 5B, respectively, assume that the object is a moving person, and illustrate shifts of the person when he or she jumps. Referring to FIG. 5A, the object continues to fall within the focus detection range of horizontal coordinate 10 at time instants $t_{-3}$ to $t_0$ and time instant $t_p$ at which prediction calculation is completed. Referring to FIG. 5B, the object falls within the focus detection range of vertical coordinate 3 at time instants $t_{-3}$ to $t_{-1}$. However, as the object, that is, the person jumps, he or she moves into the focus detection range of vertical coordinate 0 at time instant $t_0$, and moves into the focus detection range of vertical coordinate 2 at time instant $t_p$ at which prediction calculation is completed.

The prediction calculation circuit 237 obtains, via the system controller 230, motion vector information that includes the direction and amount of movement of the object and is output from the tracking unit 209, and replaces it with the coordinate position of the focus detection region. Thus, it is recognized whether the object falls within this focus detection region.

When the amount of movement of the object, which is output from the tracking unit 209, exceeds a predetermined threshold (to be referred to as an image sensing plane movement threshold hereinafter), the method of predicting movement of the object on the image plane is changed as a characteristic operation according to this embodiment. More specifically, the focus detection range used in prediction is changed to the movement destination of the object, and only detected defocus results obtained by focus detection operations closer to the immediately preceding focus detection operation are used for prediction, and the order of the image plane movement function f(t) is lowered. Again, more specifically, in the changed focus detection range, using the detected defocus results obtained by two focus detection operations at time instants $t_{-1}$ and $t_0$, the order of the image plane movement function f(t) is lowered to obtain a linear equation, and prediction calculation is performed, thereby driving the focus lens 101 based on the prediction result.

Switching the predicting method in this way makes it possible to prevent degradation in prediction accuracy as a motion of the object is influenced by the past different defocus detection results when the operation of the object is expected to have rapidly changed from the output result obtained by the tracking unit 209.

<Method of Setting Image Sensing Plane Movement Threshold>

An image sensing plane movement threshold is used to determine whether the focus detection region of interest is to be moved to an adjacent focus detection region or a farther focus detection region. Hence, to detect whether the object has moved to an adjacent focus detection region, a threshold of about 50% to 100% of each of the horizontal and vertical position intervals from the current focus detection region to the adjacent focus detection region with reference to the image sensing plane of the image sensor 212 is desirably adopted as the image sensing plane movement threshold. However, the present invention is not limited to this, and the threshold may be further increased assuming an object captured in a large image on the image sensing plane, and the prediction operation may be changed only when the object moves in a large amount.

<Operation of Digital Camera>

Figure 6:
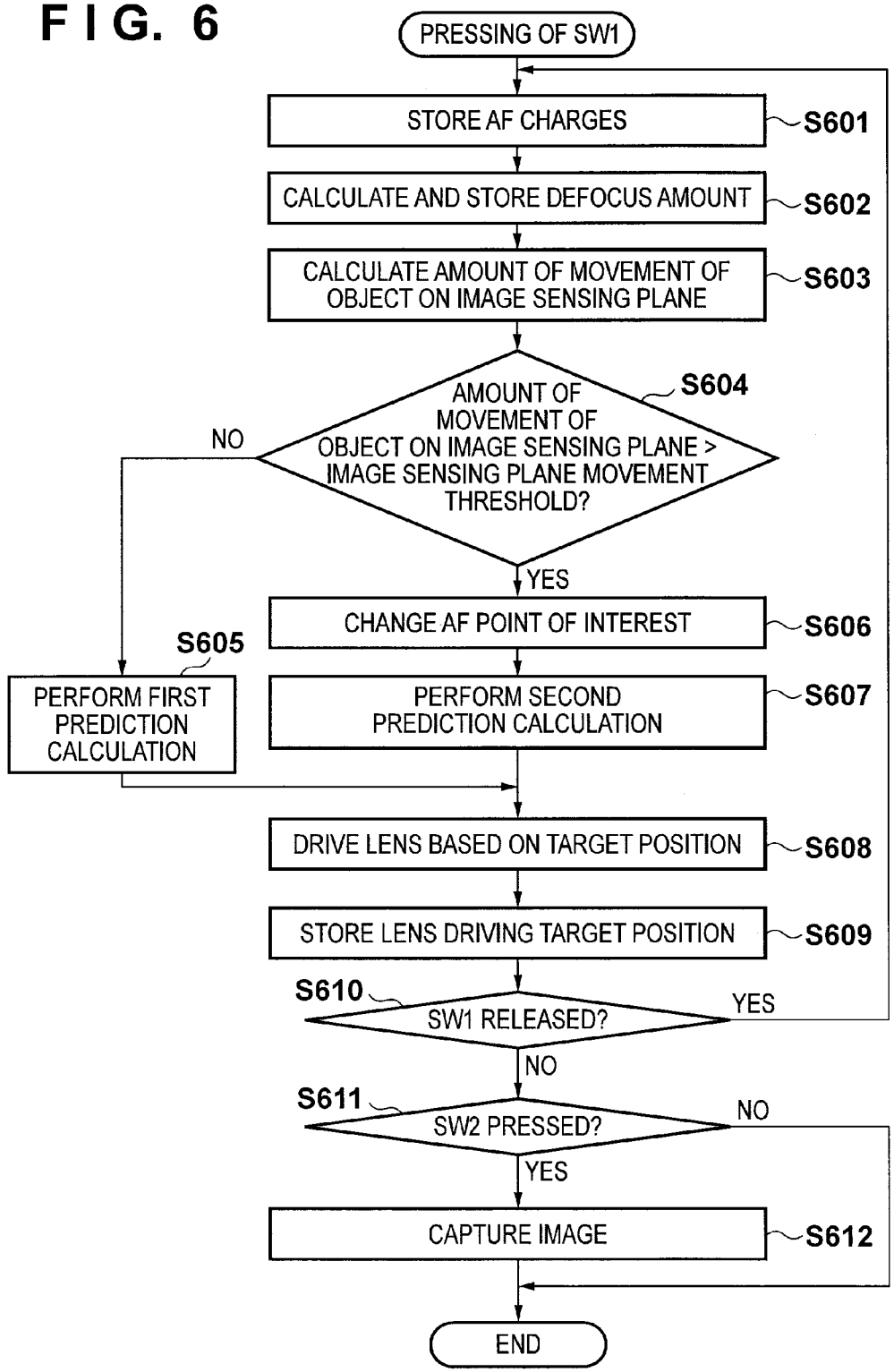
FIG. 6 is a flowchart showing an operation according to the first embodiment.

The operation according to the first embodiment mentioned above will be described with reference to a flowchart shown in FIG. 6. The system controller 230 performs the following control unless otherwise specified.

First, the release switch SW1 233 is pressed to issue an AF command so that the operation starts. Note that the digital camera 200 is powered on in advance.

In step S601, charge storage of each line sensor of the phase difference AF sensor unit 205 is performed. After charge storage, the phase difference AF sensor unit 205 outputs the storage result and the charge storage time instant (to be precise, the time instant corresponding to the middle of storage of the charge storage time) to the focus detection circuit 206. After output, the process advances to step S602.

In step S602, the focus detection circuit 206 calculates the defocus amount based on the charge storage result obtained by the phase difference AF sensor unit 205, and outputs the defocus amount and the charge storage time instant to the prediction calculation circuit 237. The prediction calculation circuit 237 stores pieces of information of the input defocus amount and charge storage time instant. After the storage, the process advances to step S603.

In step S603, using image data for photometric calculation obtained by the photometric unit 208, the tracking unit 209 detects the direction and amount of movement of the object on the image sensing plane, in synchronism with the focus detection operation of the phase difference AF sensor unit 205. A method of recognizing the object is so-called object tracking, which uses a known technique. More specifically, at the first focus detection timing, a template for the object is created to be suitable for the focus detection region of interest such as the center. The template for the object is formed by luminance information and color information. The direction and amount of movement of the object are detected by determining a position on the image sensing plane, which is closest to the template for the object, as that of the object after the movement, in image data for photometric calculation obtained by the photometric unit 208. The tracking unit 209 calculates the direction and amount of movement of the object based on the object position after the movement corresponding to the timing of the immediately preceding focus detection operation, and the object position before movement corresponding to the timing of the first focus detection operation to the past from the immediately preceding focus detection operation. The direction and amount of movement of the object are detected separately for each of the horizontal and vertical directions on the image sensing plane, and output to the prediction calculation circuit 237 via the system controller 230. After calculation, the process advances to step S604.

In step S604, the prediction calculation circuit 237 compares the input amount of movement of the object with a predetermined image sensing plane movement threshold. If the amount of movement of the object is larger than the threshold, the process advances to step S606. If the amount of movement of the object is equal to or smaller than the threshold, the process advances to step S605.

In step S605, a lens driving amount $M_p$ is calculated in accordance with equations (1) to (5) using pieces of past focus detection information $(t_0, f_0)$ to $(t_{-3}, f_{-3})$ in the focus detection region of interest. Note that the focus detection region is not changed in a subroutine in which the process passes through step S605. After calculation, the process advances to step S608.

In step S606, the focus detection region of interest recognized by the prediction calculation circuit 237 is changed based on the amount of movement of the object on the image sensing plane. After the change, the process advances to step S607. In step S607, a lens driving amount $M_p$ is calculated in accordance with equations (1) to (5) using immediately preceding focus detection information $(t_0, f_0)$ in the focus detection region of interest changed in step S606, and pieces of further past focus detection information $(t_{-1}, f_{-1})$ to $(t_{-3}, f_{-3})$ in the focus detection region of interest before the change. After calculation, the process advances to step S608.

In step S5608, the lens driving control unit 104 drives the focus lens 101 via the lens driving mechanism 103 based on the lens driving target position calculated in step s605 or S607. After driving, the process advances to step S609.

In step S609, the prediction calculation circuit 237 stores the lens driving target position for the next prediction calculation operation. After the storage, the process advances to step S610. In step S610, it is determined whether the release switch SW1 233 is released. If the release switch SW1 233 is not released, the process advances to step S611. If the release switch SW1 233 is released, the process returns to step S601.

In step S611, it is determined whether the release switch SW2 234 is pressed. If the release switch SW2 234 is pressed, the process advances to step S612, in which a predetermined shooting operation is performed. If the release switch SW2 234 is not pressed, the operation according to this embodiment ends.

With the above-mentioned operation, prediction calculation of the focus position can be performed while appropriately switching the focus detection region of interest even if the motion characteristics of the object change rapidly, thereby continuing to focus on the object.

(Modification to First Embodiment)

In the first embodiment, the tracking unit 209 performs correlation calculation using photometric image data obtained by the previous focus detection operation and that obtained by the first focus detection operation to the past from the previous focus detection operation to detect the direction and amount of movement of the object. However, the present invention is not limited to this, and the image magnification information (image magnification coefficient) of the imaging lens 100 may be output as needed from the lens controller 108 to the tracking unit 209 via the system controller 230, so that the tracking unit 209 performs correlation calculation after scaling the photometric image data based on the image magnification information. This operation makes it possible to improve the correlation calculation accuracy and, in turn, to improve the prediction calculation accuracy, thus more accurately controlling the focus.

Also, although the prediction calculation circuit 237 changes the direction of the focus detection region of interest to an arbitrary direction in the first embodiment, the present invention is not limited to this, and the prediction calculation circuit 237 may change the direction of the focus detection region of interest to only a specific direction. With such an operation, setting is made in advance to change the focus detection range in only the vertical direction when, for example, the focus is controlled to track the performance of a figure skater. When the skater jumps in the middle of the performance, his or her predicted position is expected to change at a high probability, so the operation is done to change the prediction calculation method.

(Second Embodiment)

In the first embodiment, the tracking unit 209 detects movement of the object on the image sensing plane using photometric image data obtained by the photometric unit 208. However, the present invention is not limited to this, and a digital camera 200 may be provided with a gyro to detect an orientation shift of the digital camera 200, thereby performing prediction calculation of the position of the object on the image plane while switching the focus detection region of interest using this orientation shift. When, for example, a professional cameraperson tracks the object, normally, the photographer is regarded as appropriately maintaining the composition, and continues to predict the position of the object on the image plane based on the detected defocus results corresponding to a predetermined number of past focus detection operations in the focus detection region of interest. On the other hand, when the object changes its position on the image sensing plane too rapidly to allow the photographer to appropriately maintain the composition, this photographer rapidly changes the orientation of the digital camera 200 to recompose the image. A rapid orientation shift of the digital camera 200 is detected by a gyro to appropriately change the method of predicting the position of the object on the image plane. This embodiment will be described in more detail below.

<Configuration of Digital Camera>

Figure 7:
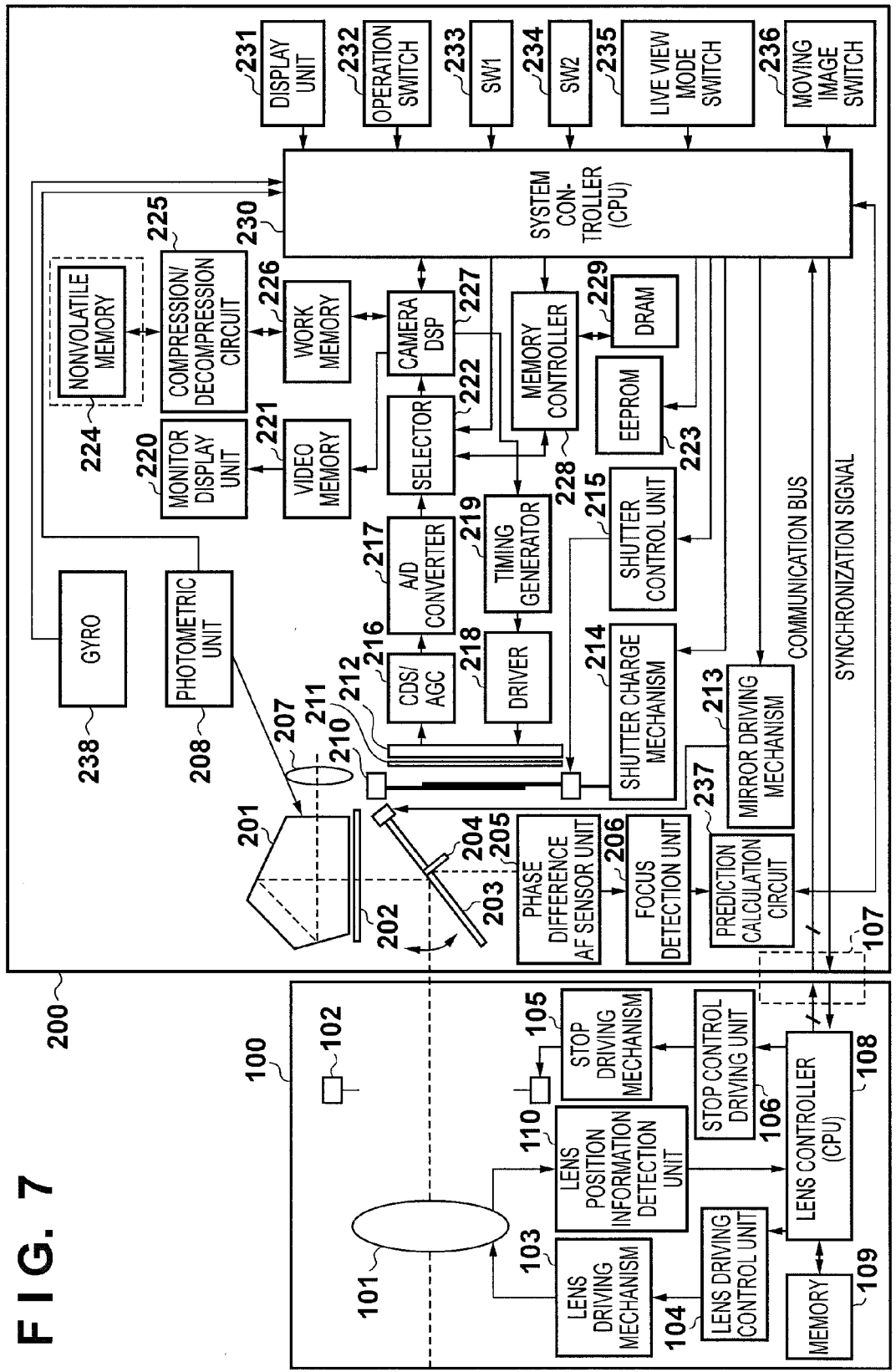
FIG. 7 is a block diagram showing the configuration of a digital camera according to the second embodiment.

FIG. 7 is a block diagram showing the configuration of a digital camera according to the second embodiment. Note that the same reference numerals as in FIG. 1 of the first embodiment denote the same constituent elements in FIG. 7. The difference from FIG. 1 lies in that in FIG. 7, the digital camera 200 includes a gyro 238 in place of the tracking unit 209 provided in the digital camera 200 shown in FIG. 1.

The gyro 238 detects the angular velocities about a total of three axes: roll/pitch/yaw axes, and calculates an angular shift in the period from immediately preceding focus detection time instant $t_0$ to focus detection time instant $t_{-1}$ corresponding to the first focus detection operation to the past from the immediately preceding focus detection operation by integrating the angular velocities about the three axes. After calculation, the gyro 238 converts the above-mentioned angular shift into the coordinate position of the focus detection region shown in FIG. 2, and outputs it to a prediction calculation circuit 237 via a system controller 230. The prediction calculation circuit 237 predicts movement of the object on the image plane based on the defocus amount in each focus detection region input from a focus detection circuit 206, and the angular shift converted into the coordinate position of the focus detection region input from the gyro 238, thereby determining the required driving amount of a focus lens 101. Because the gyro 238 converts the angular shift into the coordinate position of the focus detection region, the operation details of the prediction calculation circuit 237 are the same as in the first embodiment.

<Operation of Digital Camera>

Figure 8:
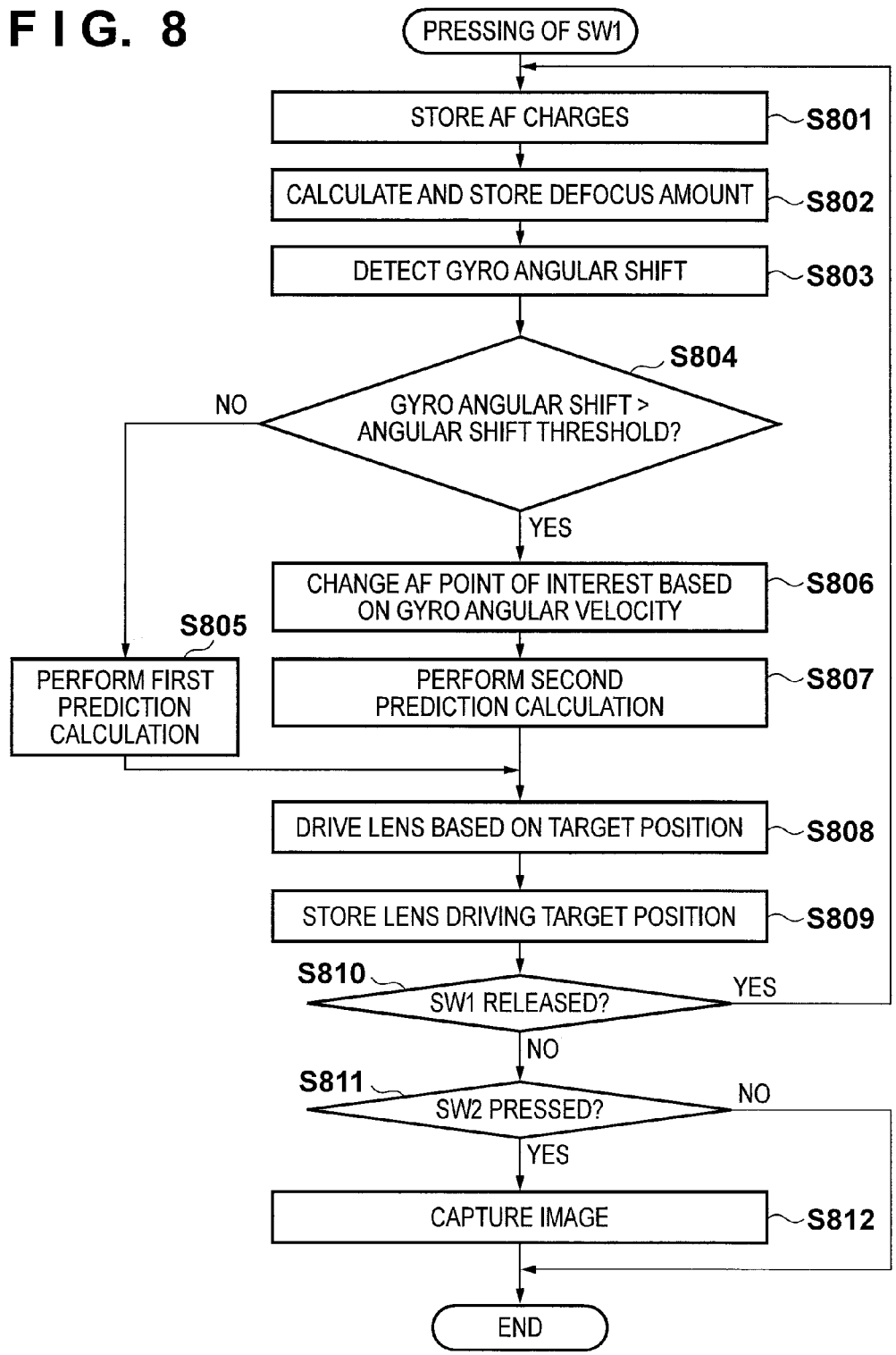
FIG. 8 is flowchart showing an operation according to the second embodiment.

The operation according to the second embodiment mentioned above will be described with reference to a flowchart shown in FIG. 8. The system controller 230 performs the following control unless otherwise specified.

First, a release switch SW1 233 is pressed to issue an AF command so that the operation starts. Note that the digital camera 200 is powered on in advance.

In step S801, charge storage of each line sensor of a phase difference AF sensor unit 205 is performed. After charge storage, the phase difference AF sensor unit 205 outputs the storage result and the charge storage time instant (to be precise, the time instant corresponding to the middle of storage of the charge storage time) to the focus detection circuit 206. After output, the process advances to step S802.

In step S802, the focus detection circuit 206 calculates the defocus amount based on the charge storage result obtained by the phase difference AF sensor unit 205, and outputs the defocus amount and the charge storage time instant to the prediction calculation circuit 237. The prediction calculation circuit 237 stores pieces of information of the input defocus amount and charge storage time instant. After the storage, the process advances to step S803.

In step S803, the gyro 238 detects a change in orientation of the digital camera 200. The gyro 238 outputs an angular shift converted into the coordinate position of the focus detection region shown in FIG. 2 to the prediction calculation circuit 237 via the system controller 230. After angular shift output, the process advances to step S804.

In step S804, the prediction calculation circuit 237 compares the input angular shift with a predetermined angular velocity threshold. If the angular shift is larger than the threshold, the process advances to step S806. If the angular shift is equal to or smaller than the threshold, the process advances to step S805.

In step S805, a lens driving amount $M_p$ is calculated in accordance with equations (1) to (5) using pieces of past focus detection information $(t_0, f_0)$ to $(t_{-3}, f_{-3})$ in the focus detection region of interest. Note that the focus detection region is not changed in a subroutine in which the process passes through step S805. After calculation, the process advances to step s808.

In step S806, the focus detection region of interest recognized by the prediction calculation circuit 237 is changed based on the angular shift converted into the coordinate position of the focus detection region. After the change, the process advances to step S807. In step S807, a lens driving amount $M_p$ is calculated in accordance with equations (1) to (5) using immediately preceding focus detection information $(t_0, f_0)$ in the focus detection region of interest changed in step S806, and pieces of further past focus detection information $(t_{-1}, f_{-1})$ to $(t_{-3}, f_{-3})$ in the focus detection region of interest before the change. After calculation, the process advances to step S808.

In step S808, the lens driving control unit 104 drives the focus lens 101 via the lens driving mechanism 103 based on the lens driving target position calculated in step S805 or S807. After driving, the process advances to step S809.

In step S809, the prediction calculation circuit 237 stores the lens driving target position for the next prediction calculation operation. After the storage, the process advances to step S810.

In step S810, it is determined whether the release switch SW1 233 is released. If the release switch SW1 233 is not released, the process advances to step S811. If the release switch SW1 233 is released, the process returns to step S801.

In step S811, it is determined whether a release switch SW2 234 is pressed. If the release switch SW2 234 is pressed, the process advances to step S812, in which a predetermined shooting operation is performed. If the release switch SW2 234 is not pressed, the operation according to this embodiment ends.

With such an operation, a rapid orientation shift of the digital camera 200 can be detected by the gyro 238, and the method of predicting the position of the object on the image plane can be changed appropriately, thereby continuing to focus on the object. More specifically, in a modification shown in FIG. 5B, as the object, that is, the person jumps, the photographer faces the digital camera 200 up so that the object jumped at time instant $t_0$ falls within the range of a desired composition. Also, when the object, that is, the person lands on the ground after a jump, the orientation of the digital camera 200 is changed to the face-down orientation so that the object that landed at time instant $t_p$ falls within the range of a desired composition. Therefore, the method of predicting the position of the object on the image plane can be appropriately changed in the condition, in which the object that falls outside the range of a desired composition with rapid movement can fall within this range, such as the condition in which the photographer is a professional cameraperson.

(Modification to Second Embodiment)

Although a configuration in which the gyro 238 is built into the digital camera 200 in FIG. 7 has been described in the second embodiment, the present invention is not limited to this, and a configuration in which the gyro 238 is built into the imaging lens 100 may be adopted. In the latter case, an output from the gyro 238 is transmitted to the digital camera 200 via the lens controller 108 to the system controller 230 so as to perform the same operation as in the second embodiment.

(Third Embodiment)

In the first embodiment, when the photographer needs to determine the composition again by a pan/tilt operation to focus on a different object, the release switch SW1 233 must be temporarily released to end the focus detection operation. Also, in the second embodiment, a composition error encountered upon rapid movement of the object must be corrected in a short period of time. To overcome these constraints, a configuration in which a digital camera 200 includes both a tracking unit (a first detection means influenced by an imaging lens) 209 according to the first embodiment, and a gyro (a second detection means that is not influenced by the imaging lens) 238 according to the second embodiment may be adopted. The third embodiment will be described in more detail below.

<Configuration of Digital Camera>

Figure 9:
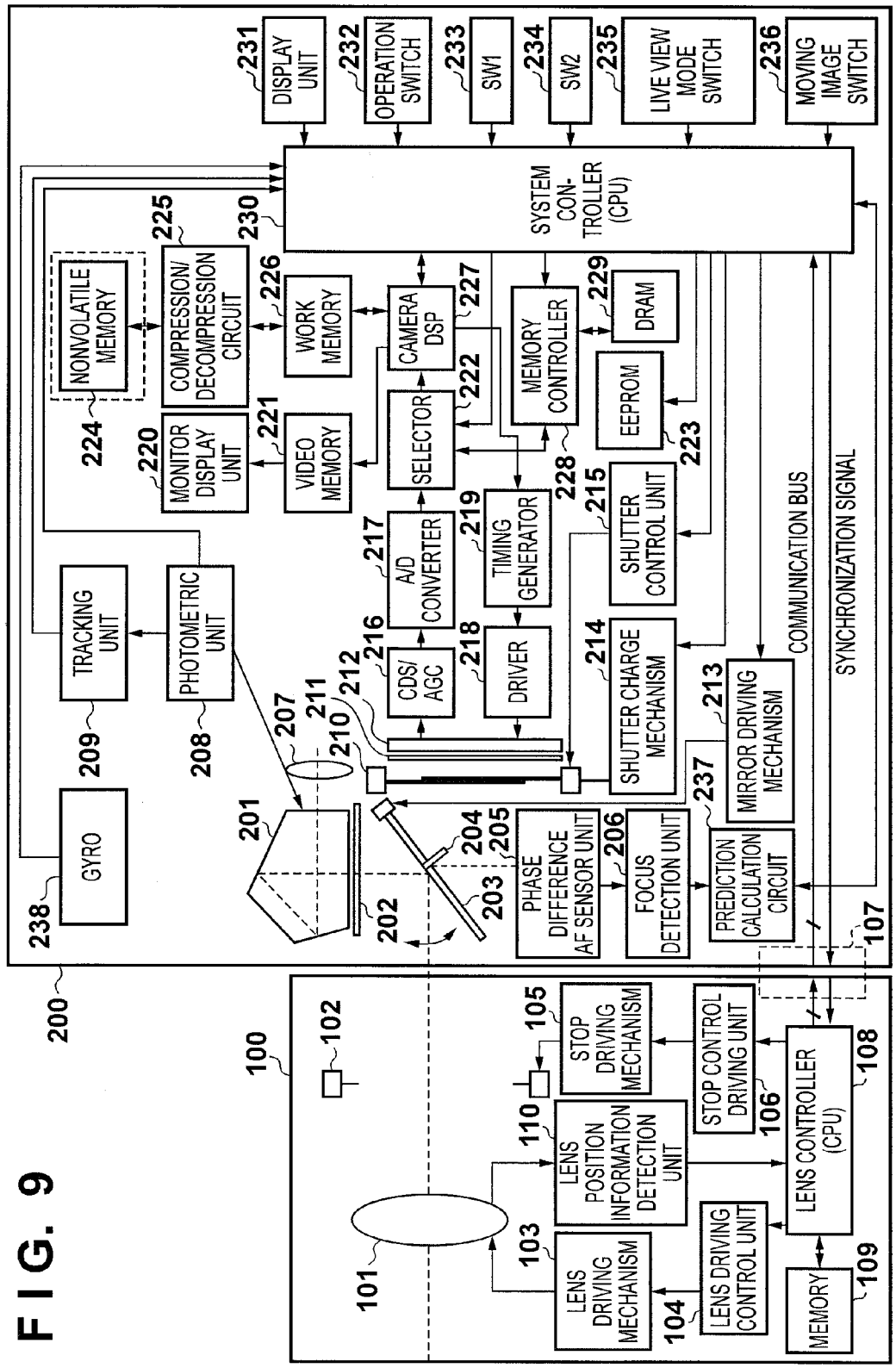
FIG. 9 is a block diagram showing the configuration of a digital camera according to the third embodiment.

FIG. 9 is a block diagram showing the configuration of a digital camera according to the third embodiment. The difference from FIG. 1 which shows the first embodiment and FIG. 7 which shows the second embodiment lies in that in FIG. 9, the digital camera 200 includes both the tracking unit 209 as described in the first embodiment, and the gyro 238 as described in the second embodiment.

The direction and amount of movement of the object based on photometric image data are input from the tracking unit 209 to a prediction calculation circuit 237 via a system controller 230. An angular shift in orientation of the digital camera 200 is also input from the gyro 238 to the prediction calculation circuit 237 via the system controller 230. The above-mentioned pieces of information such as both the direction and amount of movement of the object and the angular shift are converted into the coordinate position of the focus detection region described with reference to FIG. 2, and are input to the prediction calculation circuit 237.

<Switching of Predicting Method>

A characteristic operation according to the third embodiment, that is, an operation of switching the method of predicting movement of the object on the image plane based on pieces of information such as the direction and amount of movement of the object and the angular shift will be described next.

The direction and amount of movement of the object output from the tracking unit 209 include both movement of the object itself on the image sensing plane, and a change in orientation of the digital camera 200. On the other hand, the angular shift output from the gyro 238 includes a change in orientation of the digital camera 200. Accordingly, movement of the object can be more precisely recognized using a difference obtained by subtracting the output result obtained by the gyro 238 from that obtained by the tracking unit 209. Because movement of the object and a change in orientation of the digital camera 200 can be recognized separately, the focus detection region can be changed in accordance with the movement of the object while the photographer continues to adjust the composition without temporarily releasing a release switch SW1 233.

<Method of Setting Image Sensing Plane Movement Threshold>

An image sensing plane movement threshold has been described in the first embodiment, but it is changed in accordance with the focal length of an imaging lens 100 as well in the third embodiment. This is because as the focal length increases, a larger object image is captured, so fine movement of the focus detection region of interest is expected to become unnecessary at a higher probability. The image sensing plane movement threshold is desirably changed based on the absolute value of the focal length.

However, the present invention is not limited to this. When the imaging lens 100 uses a zoom lens, the image sensing plane movement threshold may be changed based on the amount or rate of change in focal length with reference to the focal length immediately after the release switch SW1 233 is pressed, in consideration of the probability that a zoom operation is done while the release switch SW1 233 is pressed.

<Operation of Digital Camera>

Figure 10:
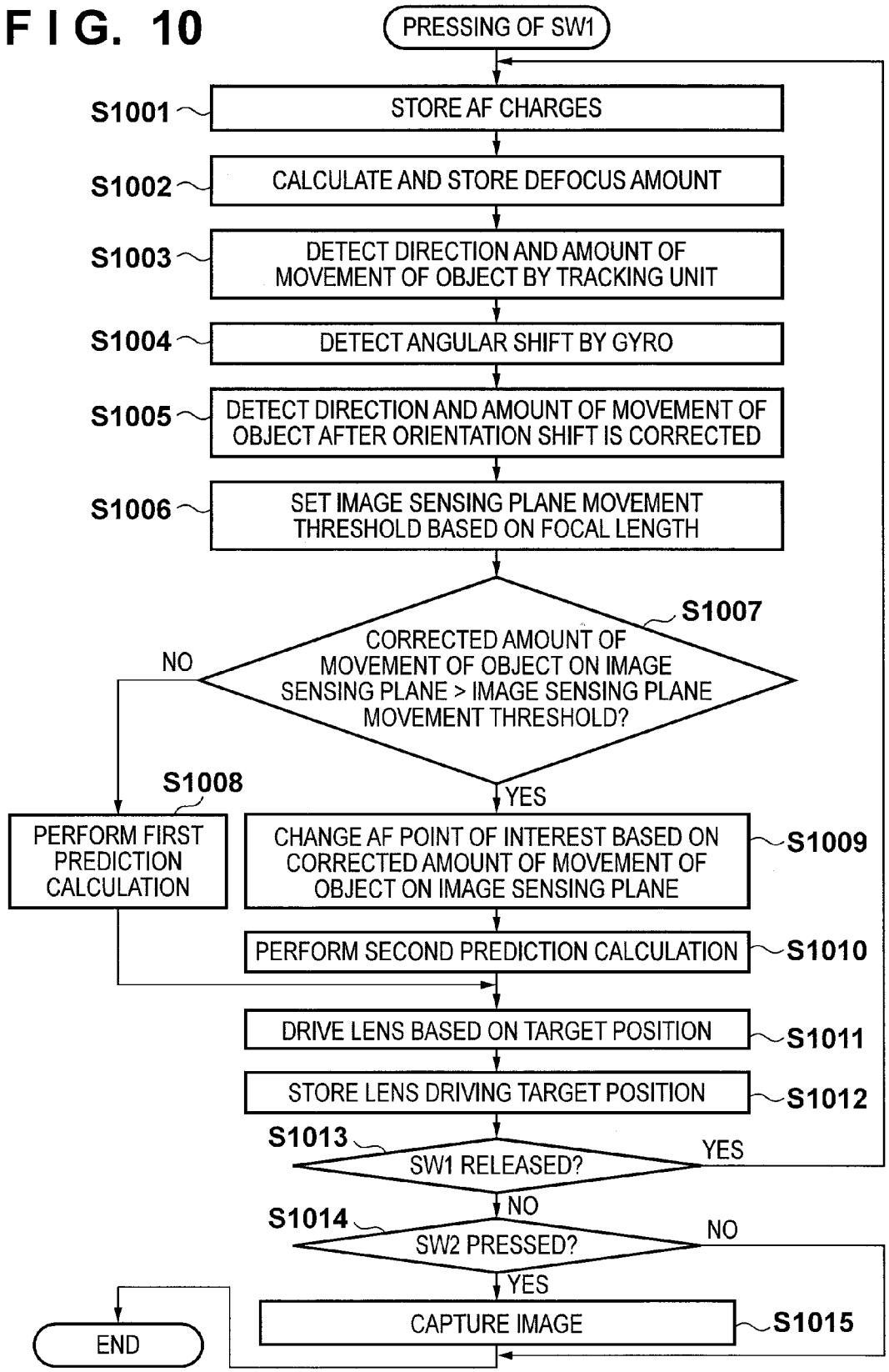
FIG. 10 is a flowchart showing an operation according to the third embodiment.

The operation according to the third embodiment mentioned above will be described with reference to a flowchart shown in FIG. 10. The system controller 230 performs the following control unless otherwise specified.

First, the release switch SW1 233 is pressed to issue an AF command so that the operation starts. Note that the digital camera 200 is powered on in advance.

In step S1001, charge storage of each line sensor of a phase difference AF sensor unit 205 is performed. After charge storage, the phase difference AF sensor unit 205 outputs the storage result and the charge storage time instant (to be precise, the time instant corresponding to the middle of storage of the charge storage time) to a focus detection circuit 206. After output, the process advances to step S1002.

In step S1002, the focus detection circuit 206 calculates the defocus amount based on the charge storage result obtained by the phase difference AF sensor unit 205, and outputs the defocus amount and the charge storage time instant to the prediction calculation circuit 237. The prediction calculation circuit 237 stores pieces of information of the input defocus amount and charge storage time instant. After the storage, the process advances to step S1003.

In step S1003, using image data for photometric calculation obtained by a photometric unit 208, the tracking unit 209 detects the direction and amount of movement of the object on the image sensing plane, in synchronism with the focus detection operation of the phase difference AF sensor unit 205. The direction and amount of movement of the object are detected separately for each of the horizontal and vertical directions on the image sensing plane, and output to the prediction calculation circuit 237 via the system controller 230. After calculation, the process advances to step S1004.

In step S1004, the gyro 238 detects a change in orientation of the digital camera 200. The gyro 238 outputs an angular shift converted into the coordinate position of the focus detection region shown in FIG. 2 to the prediction calculation circuit 237 via the system controller 230. After angular shift output, the process advances to step S1005.

In step S1005, the corrected direction and amount of movement are calculated by subtracting the angular shift obtained by the gyro 238 from the direction and amount of movement of the object obtained by the tracking unit 209. After calculation, the process advances to step S1006. In step S1006, a predetermined image sensing plane movement threshold used in step S1007 (to be described later) is set in accordance with the focal length of the imaging lens 100. After setting, the process advances to step S1007.

In step S1007, the corrected amount of movement obtained separately for each of the horizontal and vertical directions on the image sensing plane are compared with the image sensing plane movement threshold set in step S1006. If the corrected amount of movement is larger than the threshold, the process advances to step S1009. If the corrected amount of movement is equal to or smaller than the threshold, the process advances to step S1008.

In step S1008, a lens driving amount $M_p$ is calculated in accordance with equations (1) to (5) using pieces of past focus detection information $(t_0, f_0)$ to $(t_{-3}, f_{-3})$ in the focus detection region of interest. Note that the focus detection region is not changed in a subroutine in which the process passes through step S1007. After calculation, the process advances to step S1011.

In step S1009, the focus detection region of interest recognized by the prediction calculation circuit 237 is changed based on the amount of movement of the object on the image sensing plane. After the change, the process advances to step S1010. In step S1010, a lens driving amount $M_p$ is calculated in accordance with equations (1) to (5) using immediately preceding focus detection information $(t_0, f_0)$ in the focus detection region of interest changed in step S1009, and pieces of further past focus detection information $(t_{-1}, f_{-1})$ to $(t_{-3}, f_{-3})$ in the focus detection region of interest before the change. After calculation, the process advances to step S1011.

In step S1011, a lens driving control unit 104 drives a focus lens 101 via a lens driving mechanism 103 based on the lens driving target position calculated in step S1008 or s1010. After driving, the process advances to step S1012.

In step S1012, the prediction calculation circuit 237 stores the lens driving target position for the next prediction calculation operation. After the storage, the process advances to step S1013. In step S1013, it is determined whether the release switch SW1 233 is released. If the release switch SW1 233 is not released, the process advances to step S1014. If the release switch SW1 233 is released, the process returns to step S1001.

In step S1014, it is determined whether a release switch SW2 234 is pressed. If the release switch SW2 234 is pressed, the process advances to step S1015, in which a predetermined shooting operation is performed. If the release switch SW2 234 is not pressed, the operation according to this embodiment ends.

With above-mentioned operation, movement of the object can be recognized more precisely, thus improving the accuracy of a prediction operation for focus detection. Also, because movement of the object and a change in orientation of the digital camera 200 can be recognized separately, the focus detection region can be changed in accordance with the movement of the object while the photographer continues to adjust the composition without temporarily releasing the release switch SW1 233. Moreover, there is no need to correct a composition error encountered upon rapid movement of the object in a short period of time.

(Fourth Embodiment)

In the first to third embodiments, when the focus detection region of interest moves, a lens driving amount $M_p$ is calculated in accordance with equations (1) to (5) using immediately preceding focus detection information $(t_0, f_0)$ in the focus detection region of interest after the movement, and pieces of further past focus detection information $(t_{-1}, f_{-1})$ to $(t_{-3}, f_{-3})$ in the focus detection region of interest before the movement. However, the present invention is not limited to this. When the focus detection region of interest moves, a lens driving amount $M_p$ may be calculated using only immediately preceding focus detection information $(t_0, f_0)$ in the focus detection region of interest after the movement, and one piece of further past focus detection information $(t_{-1}, f_{-1})$ in the focus detection region of interest before the movement.

With such an operation, when the object moves in a direction other than the direction in which the object moves on the image plane, prediction calculation is performed using only a temporally new focus detection result without referring to a temporally old focus detection result, thus enhancing the probability that the prediction accuracy will improve.

The configuration and operation steps of a digital camera according to the fourth embodiment can be implemented in the same way as in the first to third embodiments. That is, it is only necessary to change the reference range of the pieces of past focus detection information in second prediction calculation, as described above, and lower the order of an image plane movement function f(t) to the second order in accordance with this reference range.

(Fifth Embodiment)

In the first, third, or fourth embodiment, when the tracking unit 209 detects the amount of movement of the object, the prediction calculation circuit 237 determines whether the focus detection range of interest is to be changed. However, the present invention is not limited to this. A tracking unit 209 may detect the amount of movement, and calculate the reliability level based on the degree of correlation in correlation calculation at the time of detection. Alternatively, the tracking unit 209 may output the calculated reliability level to a prediction calculation circuit 237, and the prediction calculation circuit 237 may determine based on this reliability level whether the focus detection range of interest is to be changed. The fifth embodiment will be described in more detail below.

<Configuration of Digital Camera>

The configuration of a digital camera 200 according to the fifth embodiment is the same as that of the digital camera 200 according to the first embodiment described with reference to FIG. 1. However, the tracking unit 209 calculates the reliability level of correlation calculation based on the size of the object of interest and the degree of correlation of known correlation calculation performed to detect the direction and amount of movement of the object. The tracking unit 209 outputs the calculated reliability level to the prediction calculation circuit 237 via a system controller 230, together with the detected direction and amount of movement of the object.

In general, as the size of the object increases, correlation calculation uses a larger number of pixels to determine whether the detection results have a correlation, so calculation can be done with higher accuracy. Also, even when the same object is captured, if the object is assumed to be, for example, a person, the degree of correlation decreases with a change in orientation of the person. In this case, the reliability level is too small to obtain the direction and amount of movement of the object. Accordingly, the reliability level is calculated as a numerical value so that the reliability level is high if the size of the object is larger than a predetermined criterion while the reliability level is low if the size of the object is smaller than the predetermined criterion. Also, the reliability level is calculated as a numerical value so that the reliability level is high if the degree of correlation is higher than a predetermined criterion while the reliability level is low if the degree of correlation is lower than the predetermined criterion. As an example, a reliability level R is calculated as a numerical value given by:

$$R = \alpha \times (Sin/Sstd) \times (Cin/Cstd) \quad (6)$$

where $\alpha$ is a proportionality coefficient, Sin is the size of the object in the photometric image data, Sstd is the reference size, Cin is the degree of correlation, and Cstd is the reference degree of correlation.

In equation (6), the proportionality coefficient is an arbitrary natural number, which is provided to adjust the range of the numerical value taken by the reliability level R.

<Operation of Digital Camera>

Figure 11:
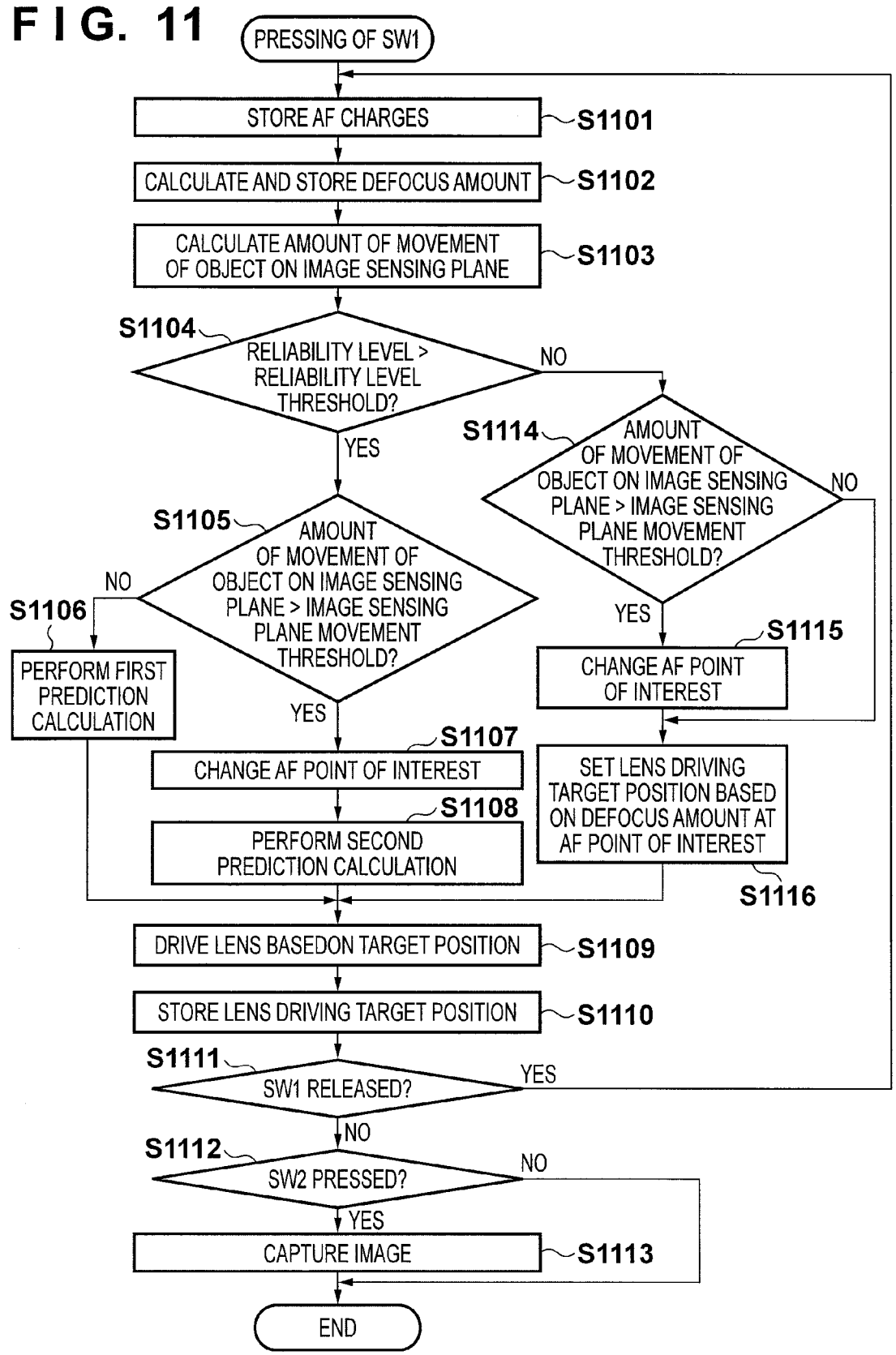
FIG. 11 is a flowchart showing an operation according to the fifth embodiment.

The operation according to the fifth embodiment mentioned above will be described with reference to a flowchart shown in FIG. 11. The system controller 230 performs the following control unless otherwise specified.

First, a release switch SW1 233 is pressed to issue an AF command so that the operation starts. Note that the digital camera 200 is powered on in advance.

In step S1101, charge storage of each line sensor of a phase difference AF sensor unit 205 is performed. After charge storage, the phase difference AF sensor unit 205 outputs the storage result and the charge storage time instant (to be precise, the time instant corresponding to the middle of storage of the charge storage time) to a focus detection circuit 206. After output, the process advances to step S1102.

In step S1102, the focus detection circuit 206 calculates the defocus amount based on the charge storage result obtained by the phase difference AF sensor unit 205, and outputs the defocus amount and the charge storage time instant to the prediction calculation circuit 237. The prediction calculation circuit 237 stores pieces of information of the input defocus amount and charge storage time instant. After the storage, the process advances to step S1103.

In step S1103, using image data for photometric calculation obtained by a photometric unit 208, the tracking unit 209 detects the direction and amount of movement of the object on the image sensing plane, in synchronism with the focus detection operation of the phase difference AF sensor unit 205. The direction and amount of movement of the object are detected separately for each of the horizontal and vertical directions on the image sensing plane, and output to the prediction calculation circuit 237 via the system controller 230. After calculation, the process advances to step S1104.

In step S1104, the prediction calculation circuit 237 compares the input reliability level of correlation calculation with a predetermined reliability level threshold. If the reliability level of correlation calculation is higher than the reliability level threshold, the process advances to step S1105. If the reliability level of correlation calculation is equal to or lower than the reliability level threshold, the process advances to step S1114.

In step S1105, the prediction calculation circuit 237 compares the input amount of movement of the object with a predetermined image sensing plane movement threshold. If the amount of movement of the object is larger than the threshold, the process advances to step S1107. If the amount of movement of the object is equal to or smaller than the threshold, the process advances to step S1106.

In step S1106, a lens driving amount $M_p$ is calculated in accordance with equations (1) to (5) using pieces of past focus detection information $(t_0, f_0)$ to $(t_{-3}, f_{-3})$ in the focus detection region of interest. Note that the focus detection region is not changed in a subroutine in which the process passes through step S1106. After calculation, the process advances to step S1109.

In step S1107, the focus detection region of interest recognized by the prediction calculation circuit 237 is changed based on the amount of movement of the object on the image sensing plane. After the change, the process advances to step S1108. In step S1108, a lens driving amount $M_p$ is calculated in accordance with equations (1) to (5) using immediately preceding focus detection information $(t_0, f_0)$ in the focus detection region of interest changed in step S1107, and pieces of further past focus detection information $(t_{-1}, f_{-1})$ to $(t_{-3}, f_{-3})$ in the focus detection region of interest before the change. After calculation, the process advances to step S1109.

In step S1109, a lens driving control unit 104 drives a focus lens 101 via a lens driving mechanism 103 based on the lens driving target position calculated in step S1106 or S1108. After driving, the process advances to step S1110.

In step S1110, the prediction calculation circuit 237 stores the lens driving target position for the next prediction calculation operation. After the storage, the process advances to step S1111. In step S1111, it is determined whether the release switch SW1 233 is released. If the release switch SW1 233 is not released, the process advances to step S1112. If the release switch SW1 233 is released, the process returns to step S1101.

In step S1112, it is determined whether a release switch SW2 234 is pressed. If the release switch SW2 234 is pressed, the process advances to step S1113, in which a predetermined shooting operation is performed. If the release switch SW2 234 is not pressed, the operation according to this embodiment ends.

In step S1114, using image data for photometric calculation obtained by the photometric unit 208, the tracking unit 209 detects the direction and amount of movement of the object on the image sensing plane, in synchronism with the focus detection operation of the phase difference AF sensor unit 205. A detection method is the same as that described in step S1105. The prediction calculation circuit 237 compares the input amount of movement of the object with a predetermined image sensing plane movement threshold. If the amount of movement of the object is larger than the threshold, the process advances to step S1115. After the focus detection region of interest of the focus detection circuit 206 is switched, the process advances to S1116. If the amount of movement of the object is equal to or smaller than the threshold, the process directly advances to step S1116. In step S1116, a lens driving target position is set based on the immediately preceding detected defocus amount in the focus detection region of interest. After setting, the process advances to step S1109.

With the above-mentioned operation, if the reliability level of correlation calculation is high, it is estimated that a large object image without defocus is obtained and prediction calculation is therefore appropriate, so prediction calculation is performed in accordance with the previous prediction calculation equation to control the focus. However, if the reliability level of correlation calculation is low, a large object image with defocus is obtained and prediction calculation is therefore inappropriate, so the detected defocus amount to be referred to is changed and prediction calculation is performed to control the focus. With such a change in prediction calculation, the focus trackability can be improved.

(Modification to Fifth Embodiment)

In the fifth embodiment, prediction calculation is changed based on the magnitude relationship between the reliability level output from the tracking unit 209 and a predetermined reliability level threshold. However, the present invention is not limited to this. If the reliability level associated with the immediately preceding focus control operation is higher than that associated with the first focus control operation to the past from the immediately preceding focus control operation, it is estimated that prediction calculation is appropriate, so prediction calculation is performed in accordance with the previous prediction calculation equation to control the focus. Also, if the reliability level associated with the immediately preceding focus control operation is lower than that associated with the first focus control operation to the past from the immediately preceding focus control operation, it is estimated that prediction calculation is inappropriate, so the detected defocus amount to be referred to is changed and prediction calculation is performed to control the focus. With such an operation, the focus trackability can be improved, as in the fifth embodiment.

Also, in the fifth embodiment, when the focus detection region of interest is changed, as described in step S1107 or S1115, focus prediction calculation cannot be continued if the detected defocus amount in the focus detection region at the change destination cannot be obtained because distance measurement is impossible. However, the present invention is not limited to this. In detecting the direction and amount of movement of the object by the tracking unit 209, a plurality of shift candidates are detected (output), and ranked based on their reliabilities. If the detected defocus amount cannot be obtained because distance measurement is impossible (focus detection is impossible) in the focus detection region after the change as a candidate with a highest reliability level, the focus detection region of interest is changed to a focus detection region as a candidate with a second highest reliability level. With such an operation, focus prediction calculation can be easily continued even if distance measurement is impossible at the change destination of the focus detection region of interest.

Moreover, in the fifth embodiment, prediction calculation is performed to control the focus, based on the immediately preceding detected defocus amount in the focus detection region after the change as a candidate with a highest reliability level, and the past detected defocus amount in the focus detection region before the change. However, the present invention is not limited to this. In detecting the direction and amount of movement of the object by the tracking unit 209, a plurality of candidates are detected, and ranked based on their reliabilities. A weighting coefficient corresponding to the reliability level is set for each of these candidates, and output from the tracking unit 209 to the prediction calculation circuit 237 via the system controller 230. The prediction calculation circuit 237 calculates prediction calculation equations corresponding to the plurality of candidates output from the tracking unit 209 to calculate lens driving amounts at target positions for these candidates. The calculated lens driving amounts are multiplied by the corresponding weighting coefficients, and the products are added (composed) to control the focus using the sum as a lens driving amount at a proper target position. With such an operation, the focus trackability can be improved, as in the fifth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-055223, filed Mar. 14, 2011, which is hereby incorporated by reference herein in its entirety.

What is claimed is:

1. An image capture apparatus which captures an object image formed by an imaging lens, the apparatus comprising:
   a focus detection unit which detects a focus position of the object image at a plurality of positions on an image sensing plane;
   a prediction unit which stores the past output from the focus detection unit, and predicts a locus of the focus position of the object image based on the stored output, thereby predicting the focus position of the object image;
   a detection unit which detects a shift of the object image on the image sensing plane in accordance with at least first information or second information, wherein the first information is information according to motion vector information of the object image and the second information is information according to motion of the apparatus; and
   a control unit which changes the output from said prediction unit based on the output from the detection unit.

2. The apparatus according to claim 1, wherein said control unit changes a range in which the past output from said focus detection unit, to be used to predict the focus position of the object image by said prediction unit, is referred to so as to find the focus position, based on the output from said detection unit.

3. The apparatus according to claim 1, wherein said detection unit outputs a reliability level of detection of a shift of the object image, and said control unit changes the output from said prediction unit based on the reliability level.

4. The apparatus according to claim 3, wherein if a reliability level of an immediately preceding focus detection operation by said detection unit is higher than a reliability level of the past focus detection operation by said detection unit, said control unit controls the focus position based on a locus of the focus position predicted in an immediately preceding prediction operation.

5. The apparatus according to claim 3, wherein if a reliability level of an immediately preceding focus detection operation by said detection unit is lower than a reliability level of the past focus detection operation by said detection unit, said prediction unit predicts a locus of the focus position again.

6. The apparatus according to claim 3, wherein said detection unit outputs a plurality of shift candidates of the object image on the image sensing plane, and outputs a reliability level corresponding to each of the plurality of shift candidates, and, if focus detection in which the output from said focus detection unit corresponding to a shift candidate with a high reliability level is obtained is impossible, said prediction unit outputs a prediction result based on the output from said focus detection unit corresponding to a shift candidate with a low reliability level.

7. The apparatus according to claim 3, wherein said prediction unit sets weighting coefficients based on the plurality of shift candidates and the corresponding reliabilities output from said detection unit, and creates a locus of the focus position corresponding to each of the plurality of shift candidates in accordance with the weighting coefficient, and said control unit controls the focus position in accordance with the created locus of the focus position.

8. The apparatus according to claim 1, wherein said detection unit corrects the detected shift based on an image magnification coefficient of the imaging lens.

9. The apparatus according to claim 1, wherein said detection unit detects a shift in only a direction on the image sensing plane, which is designated in advance.

10. The apparatus according to claim 1, wherein the second information is information according to an output from gyro sensor.

11. The apparatus according to claim 10, wherein the gyro sensor is located in the apparatus.

12. The apparatus according to claim 10, wherein the gyro sensor is located in the imaging lens.

13. An image capture apparatus which captures an object image formed by an imaging lens, the apparatus comprising:
a focus detection unit which detects a focus position of the object image at a plurality of positions on an image sensing plane;
a prediction unit which stores the past output from said focus detection unit, and predicts a locus of the focus position of the object image based on the stored output, thereby predicting the focus position of the object image at a predetermined time instant;
a first detection unit which detects a shift of the object image on the image sensing plane using a method in which said first detection unit is influenced by the imaging lens;
a second detection unit which detects a shift of the object image on the image sensing plane using a method in which said second detection unit is not influenced by the imaging lens; and
a control unit which changes the output from said prediction unit based on a difference between the output from said first detection unit and the output from said second detection unit.

14. The apparatus according to claim 13, wherein said control unit changes the output from said prediction unit in accordance with a focal length of the imaging lens.

15. The apparatus according to claim 13, wherein said prediction unit compares the output from said detection unit with a predetermined threshold, and, if the output from said detection unit is larger than the threshold, predicts the focus position of the object image based on the past output from said focus detection unit in a period from a timing immediately before the output from said detection unit becomes larger than the threshold until a timing of an immediately preceding focus detection operation.

16. The apparatus according to claim 13, wherein said prediction unit compares the output from one of said first detection unit and said second detection unit with a predetermined threshold, and, if the output from the one of said first detection unit and said second detection unit is larger than the threshold, predicts the focus position of the object image based on the past output from said focus detection unit in a period from a timing immediately before the output from the one of said first detection unit and said second detection unit becomes larger than the threshold until a timing of an immediately preceding focus detection operation.

17. The apparatus according to claim 13, wherein said first detection unit outputs a reliability level of detection of a shift of the object image, and said control unit changes the output from said prediction unit based on the reliability level.

18. The apparatus according to claim 17, wherein the reliability level is calculated based on a size of the object image on the image sensing plane.

19. The apparatus according to claim 17, wherein if a reliability level of an immediately preceding focus detection operation by said first detection unit is higher than a reliability level of the past focus detection operation by said first detection unit, said control unit controls the focus position based on a locus of the focus position predicted in an immediately preceding prediction operation.

20. The apparatus according to claim 17, wherein if a reliability level of an immediately preceding focus detection operation by said first detection unit is lower than a reliability level of the past focus detection operation by said first detection unit, said prediction unit predicts a locus of the focus position again.

21. The apparatus according to claim 17, wherein said first detection unit outputs a plurality of shift candidates of the object image on the image sensing plane, and outputs a reliability level corresponding to each of the plurality of shift candidates, and, if focus detection in which the output from said focus detection unit corresponding to a shift candidate with a high reliability level is obtained is impossible, said prediction unit outputs a prediction result based on the output from said focus detection unit corresponding to a shift candidate with a low reliability level.

22. The apparatus according to claim 13, wherein said first detection unit detects a shift in only a direction on the image sensing plane, which is designated in advance.

* * * * *